A. M. WHITE.
FASTENING FOR HORSESHOES.
APPLICATION FILED MAY 14, 1914.
1,332,089.
Patented Feb. 24, 1920.
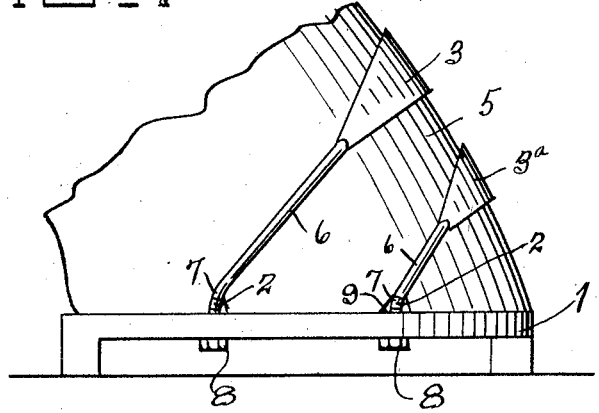
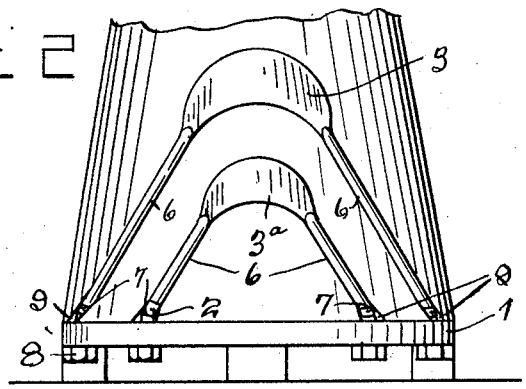
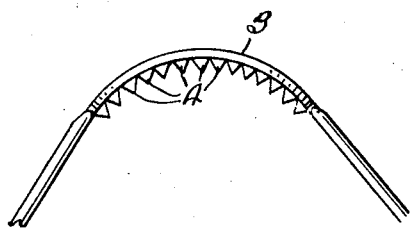
Inventor
A. M. White

UNITED STATES PATENT OFFICE.

ANDREW MERILLE WHITE, OF GRAYTON, MARYLAND.

FASTENING FOR HORSESHOES.

1,332,089. Specification of Letters Patent. Patented Feb. 24, 1920.

Application filed May 14, 1914. Serial No. 838,531.

*To all whom it may concern:*

Be it known that I, ANDREW M. WHITE, a citizen of the United States, residing at Grayton, in the county of Charles and State of Maryland, have invented certain new and useful Improvements in Fastenings for Horseshoes, of which the following is a specification.

This invention relates to fastenings for horseshoes, and one of the principal objects of the same is to provide simple, reliable and efficient means for holding a shoe on a horse without driving nails into the hoof as in many cases it is found impossible to drive nails into the foot of the horse owing to broken hoofs or tender feet.

Another object of the invention is to provide means for securing a shoe to a horse's hoof which can be quickly adjusted without the necessity of employing a blacksmith or horseshoer.

These and other objects may be attained by means of the construction illustrated in the accompanying drawing, in which, Figure 1 is a side elevation of a horseshoe secured to the hoof of a horse by means of a fastener made in accordance with this invention;

Fig. 2 is a front elevation of the same; and

Fig. 3 is an edge view of one of the clips or fasteners showing the saw teeth or roughened surface for engaging the hoof.

Referring to the drawing, the numeral 1 designates a horseshoe which may be of the usual or any suitable construction and provided with openings at the opposite sides thereof to receive the threaded ends 2 of the clips.

The clips are provided with flattened central portions 3 having roughened or saw-teeth points 4 formed upon the edges thereof to engage the hoof 5 and to prevent their slipping from the hoof. Connected to the flattened portion 3 are the shanks 6 of the clips, said shanks being bent at 7 and extended through the openings in the shoe. Nuts 8 are fitted to the ends of the shanks, and the clips may be adjusted whenever desired by means of the nuts 8 fitted to the ends of said shanks.

As shown in the drawing there are two of the clips 3 and 3ª of substantially the same construction, one being shorter than the other, as shown.

In order to prevent the slipping forward of the clips, notches 9 may be formed in the sides of the hoof at the points where the shanks extend through the shoe.

These clips may be made of different sizes to fit all sizes of hoofs and for use with various sizes of shoes.

From the foregoing it will be obvious that a horseshoe held to a hoof by means of the clips described will not require driving nails in the foot of the animal to make it lame, and that any person can properly adjust the shoe to the foot without special tools. The clips are preferably made of nickel-plated metal and are ornamental as well as useful.

Various changes may be made in the details of construction without departing from the spirit and scope of the invention as defined in the claim.

What is claimed is:—

A horseshoe attaching device comprising in combination with a horseshoe, a pair of crescent-shaped plates curved longitudinally to conform to the transverse curvature of the outer forward side of a horse's hoof and adapted to be applied to said side one above the other with their concave edges lowermost, each plate being provided with a row of teeth adapted to enter the hoof, and shanks extending downwardly and rearwardly from the ends of the plates and having their lower ends connected to the shoe adjacent its inner edge so as to be received in notches formed in the sides of the hoof adjacent the shoe, the plates and shanks holding the shoe against any downward or rearward movement with relation to the hoof and the engagement of the shanks in the notches in the hoof holding the shoe and plates and shanks against any forward movement with relation to the hoof, and the teeth on the plates holding the plates against any downward or endwise movement with relation to the hoof.

In testimony whereof I affix my signature in presence of two witnesses.

ANDREW MERILLE WHITE.

Witnesses:
BRAXTON B. SMITH,
CHAS. T. GOODS.